Patented July 4, 1950

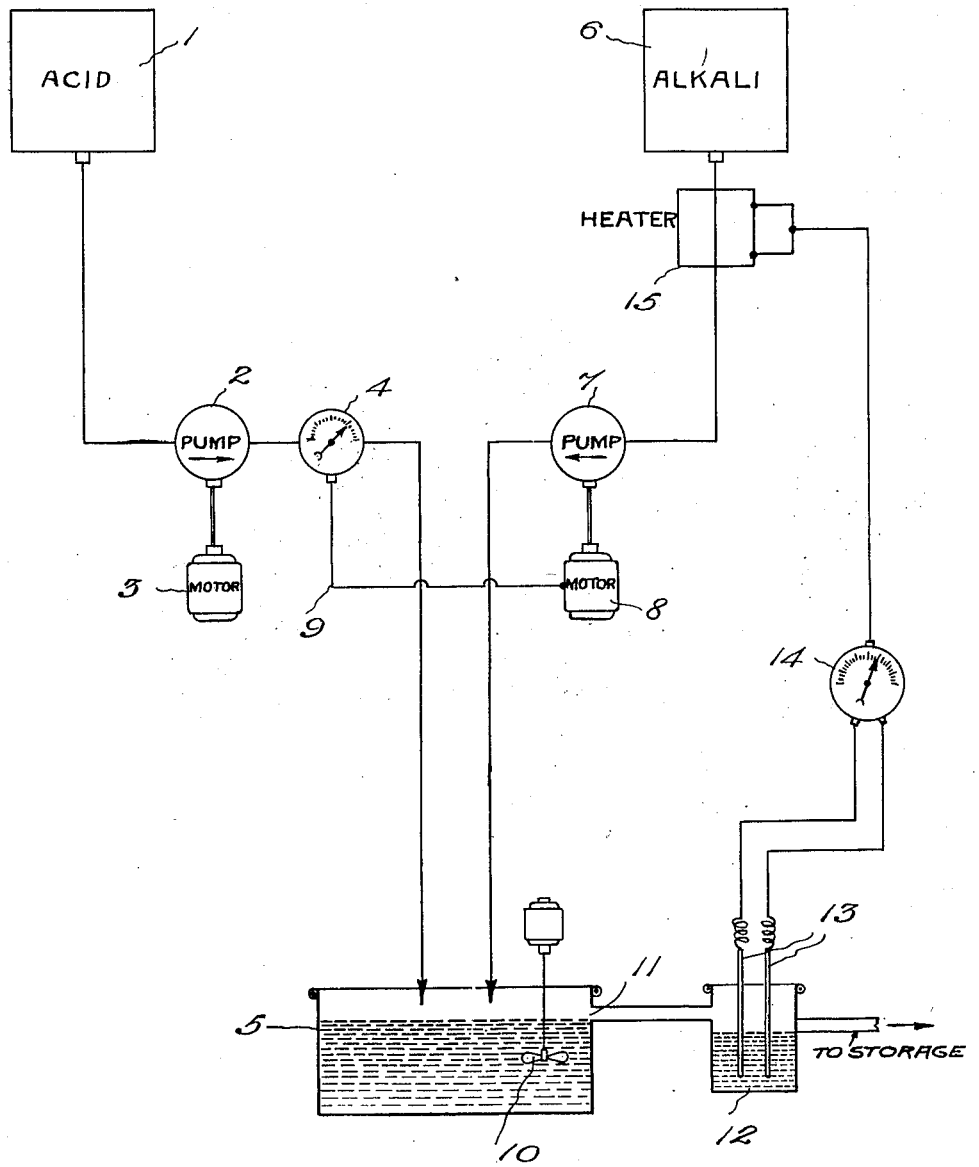

2,513,562

UNITED STATES PATENT OFFICE 2,513,562

METHOD AND APPARATUS FOR THERMALLY REGULATING GRAVIMETRIC FLOW OF LIQUIDS

Stanley Joseph Holuba, North Bergen, N. J., assignor to Colgate-Palmolive-Peet Company, Jersey City, N. J., a corporation of Delaware Application June 6, 1942, Serial No. 446,105

4 Claims. (Cl. 23—230)

The present invention relates to a method of controlling fluid flow and, more particularly, to a method of thermally regulating the weight of liquid passing through a conduit, and to an apparatus therefor.

It is frequently desirable to control the weight of liquid to or from a vessel or past a given point or to proportion the weights of two or more liquids into a conduit or pool, there to be admixed with each other. Such regulation is usually achieved by valves and meters, which can be readily changed as desired. However, where the proportions or amounts of liquids passed are critical within narrow ranges, it is very difficult to make minor mechanical adjustments, such as by throttling valves or by increasing or decreasing the output of a pump, with sufficient precision to be completely satisfactory.

It is an object of the present invention to provide a new method for precisely controlling gravimetric flow of fluids.

It is another object of the invention to provide a novel method for regulating the weight of liquid flowing past a given point by varying the density and/or viscosity of the liquid stream.

It is also an object of this invention to provide a new method for governing the weight of a liquid flowing past a given point by changing its temperature by a predetermined amount to cause variations in the density of the liquid.

The present invention also contemplates the provision of a new method for controlling the pH of a neutralized product within narrow limits.

Furthermore, this invention has in contemplation the provision of a novel apparatus for automatically controlling the weight of a liquid passing through a conduit.

The invention further provides an apparatus for thermally governing the weights of reactants delivered to a neutralizing vessel in order automatically to control the pH of the neutralized product.

Other objects and advantages of the invention will be apparent from the following description, taken in conjunction with the accompanying drawing, wherein the figure is a representation, largely diagrammatic, of an apparatus assembly in accordance with the present invention.

According to this invention, the temperature of a fluid passing through a conduit is adjusted to govern the weight of liquid or gas passed. It is contemplated that the method of the invention has its widest application when used in conjunction with other methods of more grossly controlling the weight of a liquid past a given point in unit time. Such grosser methods may be by means of a volumetric displacement pump, an orifice or other control devices well-known to the art. When employing a positive volumetric displacement pump, the temperature of a measured or proportioned volume of liquid passing through a conduit leading to the pump may be adjusted according to this invention to cause slight changes in density of the liquid and thus to govern the weight of liquid passed.

Where the rate of liquid delivered is controlled by the pressure drop through an orifice or a delivery line, as with a centrifugal pump, changes in the viscosity of the liquid may be the determining factor in controlling the weight of liquid passed, and variations in temperature may be applied according to this invention to govern the weight of liquid passed in unit time, largely by slight changes in its viscosity. However, as the density of the liquid also changes with variations in temperature, correction of temperature variations to compensate for such changes in density are also contemplated, as aforesaid. The adjustment of temperature may be made automatically by heating units (or cooling units) which may be electrically controlled by devices which measure the results of said variations in temperature.

The invention is particularly adaptable for proportioning liquids where small differences in the amount of one liquid or another delivered may effect large differences in result, such as where a material to be neutralized and a neutralizing agent are reacted to produce a product of desired pH. An electrometric pH meter may be associated with a heating unit, as through relays, photoelectric cells and/or other suitable means, and the heating unit may be disposed to apply heat to the conduit through which either liquid flows to the proportioning equipment. The pH meter may be set to turn on the heating unit at a specified pH value and to turn it off at a different value, or the meter may be set to increase and decrease heat furnished to the conduit by small increments, thus in either case alternately and automatically increasing and decreasing the temperature of the liquid flowing therethrough. Such variations in temperature will effect changes in the proportions of liquid and accordingly affect the pH of the product. Although not preferred, the heating units may be associated with both conduits to change the temperature of both liquids either differentially in the same direction or oppositely.

The following description of an apparatus for preparing a neutralized product of desired pH is illustrative of a single adaptation of the present invention, and it will be understood that the invention is not limited thereto.

Referring to the drawing, reference character 1 designates a supply tank for holding acid, the outlet of the tank being connected through a conduit with a positive volumetric displacement pump 2 driven by a motor 3. A pipe from the pump leads through a volumetric meter 4 into a neutralizing vessel 5. The outlet of an alkali supply tank 6 is connected through a conduit to a second positive volumetric displacement pump 7, which is driven by a motor 8. Lead wires 9 connect the meter 4 with the motor 8, and means, not shown, are provided to control the speed of motor 8 by the position of the indicator on the meter. A conduit connected to the delivery end of the second pump 7 leads into the neutralizer 5, and a mechanical stirrer 10 is provided in the neutralizing vessel. An outlet 11 in the neutralizer connects with a trap 12, wherein are provided dip type electrodes 13 of a pH meter 14. A heating unit 15 associated with the conduit leading from the outlet of the alkali supply tank to the pump 7 is provided, and means, not shown, are supplied for controlling the heating unit according to the pH value indicated on the pH meter 14. Such means may comprise any suitable electrical device, such as provided with the "Micromax" recorders.

The operation of this equipment is very simple and can be placed in the charge of even non-technical operators. Acid and alkali flow from the outlets of tanks 1 and 6, respectively, to the positive volumetric displacement pumps 2 and 7. Pump 2 is driven by motor 3, which is attached to a prime source of power, and pump 7 is driven by motor 8. The acid is pumped at a desired volumetric rate and flows through the meter 4, which indicates the rate of flow. Through the lead wires 9, the indicator of the meter 4 controls the speed of the motor 8, so that the equipment can be set to deliver a desired volumetric proportion of alkali with respect to the rate of acid flow. The acid and alkali are both delivered to the neutralizing tank 5, and the agitator 10 provides a thorough mixing to effect neutralization.

The neutralized product flows from the outlet 11 into the conduit leading to the storage tank and, during its passage thereto, the product flows through the trap 12 wherein the dip type electrodes of the pH meter are placed. The pH of the neutralized product is indicated on the meter 14. The heating unit 15 which surrounds the conduit from the alkali supply tank 6 to the proportioning pump 7 is attached to the pH meter, and the heat supplied by this unit to the conduit is governed by the indicator on the pH meter. As the pH rises to a predetermined value, the heater is turned on, and the temperature of the alkali is increased. This increase in temperature effects a reduction in the density of the alkali, so that the same volume of alkali delivered by the pump in unit time weighs less. The reduction in weight of alkali to the neutralizing tank provides a product of lower pH. As the pH meter indicates this decrease in the pH value, the indicator drops to a predetermined point at which the heater is turned off, thus permitting the temperature of the alkali to fall, whereby the density of the liquid increases, more alkali is delivered, and the pH rises.

The heating unit may be thermostatically controlled, if desired, and the pH meter may be employed to control the thermostat. According to this modification, a change in pH to a predetermined value may be used to change the setting of temperature limits on the thermostat.

In another method of controlling the heating unit associated with the alkali conduit, the pH meter can be so connected thereto that, as the pH value rises, the current supplied to the unit can be progressively increased. Conversely, as the pH value declines, the heat supplied is diminished. This type of connection avoids the broad swings and "hunting" of the simple connection which merely turns the heater on and off, and such connection may also be used in conjunction with thermostatic control, as described in the preceding paragraph.

It will be understood from the foregoing that the heating unit may alternatively be associated with the conduit leading from the acid supply tank; in this case, the connection between the heating unit and pH meter would be so set that the heat supplied to the acid conduit would be increased as the pH falls, and vice versa. If desired, heating units may be associated with both conduits, the heat supplied to the alkali conduit increasing with rising pH values, and the heat supplied to the acid conduit increasing with falling pH values. It will also be appreciated from the foregoing that other than electrical heating units may be provided, and that any of these units, whether electrical or not, may be either electrically controlled from the pH meter or may be manually or mechanically operated according to readings thereon. Similarly, the neutrality or degree of alkalinity or acidity of the final product may be measured by means other than a pH meter and/or in terms other than pH.

Where the volumetric delivery of a liquid is controlled by the back pressure on a pump or by pressure drop across an orifice of predetermined size, changes in viscosity of the liquid with temperature variations are apt to make greater differences in weight of liquid delivered than are corresponding changes in density with said temperature variations. As the viscosity of a liquid generally decreases with rising temperature, permitting a greater weight of material to flow past the orifice with increased temperature, the effect of temperature rise is consequently contrary to that provided when change in density is a controlling factor. Therefore, assuming liquids of usual temperature-viscosity characteristics, where viscosity decreases with temperature rise, if centrifugal pumps with orifice outlets were to replace the positive volumetric displacement pumps in the outlets of the acid and alkali supply tanks for the neutralization equipment described, the heating unit associated with the alkali conduit would be so connected to the pH meter that a rise in pH value would decrease the heat supplied to the conduit, while a fall in pH value would increase the heat supplied.

The diminution in weight of material passing through an orifice by reason of lowered viscosity with increase in temperature is partially compensated by the decrease in density of the material. Thus, as the lowered viscosity provides an increased volume of material passing through the orifice, each unit volume is of slightly lower weight. The actual change in gravimetric delivery with variation in temperature is a function of changes in both density and viscosity, and the magnitude and direction of the net change is determined for a liquid of given characteristics by the design of the pumping system.

The present invention is capable of wide application and adaptation. The process and apparatus described may be used for any system wherein it is desired to deliver a predetermined gravimetric amount or gravimetric proportion of a liquid during unit time. Thus, this invention may be employed in fat splitting, hydrolysis and saponification operations, just as well as in the neutralization procedure set forth. It may be similarly employed in sulphonation, nitration, diazotization, halogenation, condensation reactions, dyeing operations, double decompositions, oxidation and reduction reactions, and in any reaction where it is desired to provide accurate control for the addition to a reaction mixture of one or more reactants or agents.

Very small changes in temperature may provide relatively large differences in result. Thus, in neutralization reactions, where the invention has one of its most useful applications, it has been found that temperature differences of even a few degrees can give very wide changes in pH. In neutralizing the sulphuric acid esters of coconut oil fatty acids monoglycerides, as made in accordance with the disclosure in U. S. Patent No. 2,130,361 to Muncie, with sodium hydroxide, proportioning volumetric displacement pumps are employed to mix the acid reagent at about 100° F. with a 25° Bé. aqueous solution of sodium hydroxide at about 75° F. The proportioning pumps are so set that a neutralized product having a pH of about 7.0 is obtained. The temperature of the sodium hydroxide solution is then raised to about 79° F., and this 4° rise in temperature of the alkali is sufficient to effect the dropping of the pH of the product down to about 6.0.

Although the present invention has been described with respect to particular embodiments and examples, it will be appreciated by those skilled in the art that variations and modifications of the invention may be made and that various equivalents may be substituted therefor without departing from the true spirit of the invention. Thus, although the results of changes in gravimetric flow have been described for the preferred embodiment in terms of changes in pH and as measurable by a pH meter, it will be apparent from the foregoing that other results and means for measuring said other results may be the significant characteristics in other reactions. For example, a photoelectric cell or a turbidimeter may be employed to measure the completeness or opacity of a precipitation; a torsion viscosimeter may be used to measure the thickness of a sludge produced, or colorimetric, density or compressibility tests may be made to determine the condition of a reaction, etc. Similarly, while the invention has been described particularly with respect to the control of the gravimetric rate of flow of liquids, it is also applicable in like manner in the case of gases and for regulating the gravimetric rate of flow of gaseous streams.

These and other variations and modifications are believed to be within the scope of the present specification and within the purview of the appended claims.

I claim:

1. The process of producing a reaction product of predetermined composition, said predetermined composition being dependent upon the gravimetric rate of flow of materials into contact with each other from at least two streams, which comprises bringing one of said streams into concurrent contact with the other stream at a regulated volumetric rate proportioned to the regulated volumetric rate of flow of said other stream, said proportioned rate being regulated to provide a reaction product of approximately the desired composition containing all the ingredients of said streams, obtaining a measurement related to the departure of the composition of the reaction product from the predetermined composition, and adjusting the temperature of one of the streams independently of the other in advance of the point of regulation of the flow rate thereof, the adjusting of the temperature being in a direction to produce the predetermined composition.

2. The process of obtaining a reaction product of desired pH which comprises continuously delivering a stream of acidic material and a stream of basic material into a reaction vessel; regulating the volumetric rate of flow of one of said streams relative to the volumetric rate of flow of the other of said streams to provide a reaction product of desired pH; continuously withdrawing reaction product from said vessel; measuring the pH of the reaction product; and changing the temperature of the stream of one of said materials before the stream thereof reaches the point of regulation of the volumetric rate of flow in accordance with deviations of measured pH from desired pH, thereby controlling, at a substantially constant volumetric rate of flow, the gravimetric proportion of said materials to obtain a reaction product of desired pH.

3. An apparatus comprising a mixer; at least two feed conduits and an outlet conduit for said mixer; proportioning means for regulating the volumetric rate of flow of fluids in one of said feed conduits in relation to the volumetric rate of flow in another of said feed conduits; a heat exchanger operably connected with one of said feed conduits in advance of the proportioning means; means for controlling the amount of heat exchange; a pH meter associated with said outlet conduit for measuring the pH of the fluid leaving said mixer; and means operably connecting said pH meter with said control means for said heat exchanger for modifying the temperature of the fluid flowing through the conduit with which said heat exchanger is connected to correct for any deviation in the measured pH from a predetermined desired pH.

4. The process of producing a reaction product of predetermined composition which comprises continuously delivering two streams containing the reactants into a reaction chamber and withdrawing product therefrom, regulating the volumetric rate of flow of one of said streams relative to the volumetric rate of flow of the other stream to provide a reaction product closely approximating said predetermined composition, measuring a characteristic of the product related to its composition, and changing the temperature of one of the streams in advance of the point where its volumetric rate of flow is regulated to make correction for a deviation in the measured characteristic from the predetermined composition.

STANLEY JOSEPH HOLUBA.

REFERENCES CITED

The following references are of record in the file of this patent:

UNITED STATES PATENTS

| Number | Name | Date |
|---|---|---|
| 1,340,649 | Crandon | May 18, 1920 |
| 1,450,023 | Edelman | Mar. 27, 1923 |
| 1,534,091 | Smoot | Apr. 25, 1925 |
| 1,594,264 | Howard | July 27, 1926 |
| 1,624,294 | Wallace et al. | Apr. 12, 1927 |
| 1,654,614 | Smith | Jan. 3, 1928 |
| 1,739,230 | Hickman | Dec. 10, 1929 |
| 1,759,996 | Parker | May 27, 1930 |
| 1,870,982 | Behr | Aug. 9, 1932 |
| 2,009,622 | Kennedy | July 30, 1935 |
| 2,031,018 | Thomas | Feb. 18, 1936 |
| 2,063,140 | Allison | Dec. 8, 1936 |
| 2,133,735 | Waterman et al. | Oct. 18, 1938 |
| 2,262,194 | Newton | Nov. 11, 1941 |
| 2,281,282 | Gerhold | Apr. 28, 1942 |
| 2,321,573 | Chace | June 15, 1943 |